March 4, 1924.

J. WILBUR 1,485,899

AUTOMATIC CUT-OFF VALVE FOR GAS SUPPLY PIPES

Filed Aug. 30, 1922

Inventor
John Wilbur
by Orwig & Hague, Attys

Patented Mar. 4, 1924.

1,485,899

UNITED STATES PATENT OFFICE.

JOHN WILBUR, OF MARSHALLTOWN, IOWA.

AUTOMATIC CUT-OFF VALVE FOR GAS-SUPPLY PIPES.

Application filed August 30, 1922. Serial No. 585,141.

*To all whom it may concern:*

Be it known that I, JOHN WILBUR, a citizen of the United States, and a resident of Marshalltown, in the county of Marshall, State of Iowa, have invented a certain new and useful Automatic Cut-Off Valve for Gas-Supply Pipes, of which the following is a specification.

This invention relates to improvements in valves designed to be used in gas supply pipes such as are placed in buildings for furnishing gas to light fixtures and stoves, and to be placed near the fixture or stove in such a manner that excessive heat, produced by any cause such as accidental fires or overheated stoves, will cause the supply of gas to be automatically cut off.

It is the object of my invention to provide such a valve of comparatively simple, durable and inexpensive construction that will be absolutely reliable in its operation.

A further object is to so construct a valve that it may be used either as an ordinary cut-off valve, or as an automatic cut-off valve.

A further object is to provide in a manually operated or an automatic closing valve employing a fusible metal for releasing a valve member when the valve casing has become excessively heated, an improved method for mounting the automatic cut-off valve member in operative relation with the manually operated member for controlling the same.

A further object is to utilize a portion of the fusible material of the valve above referred to, to assist in sealing the valve against leaking when the same is open or in an operative position.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 3:
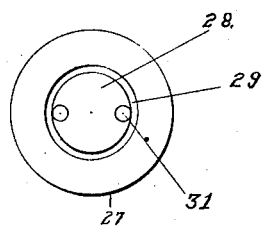
Figure 3 is a top view of the sealing valve member.
Figure 2:
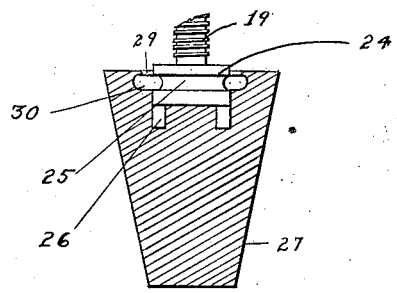
Figure 2 is an enlarged detail view showing the manner in which the operating member is supported within the automatic sealing valve member, the fusible metal being omitted to more clearly show the construction.
Figure 1:
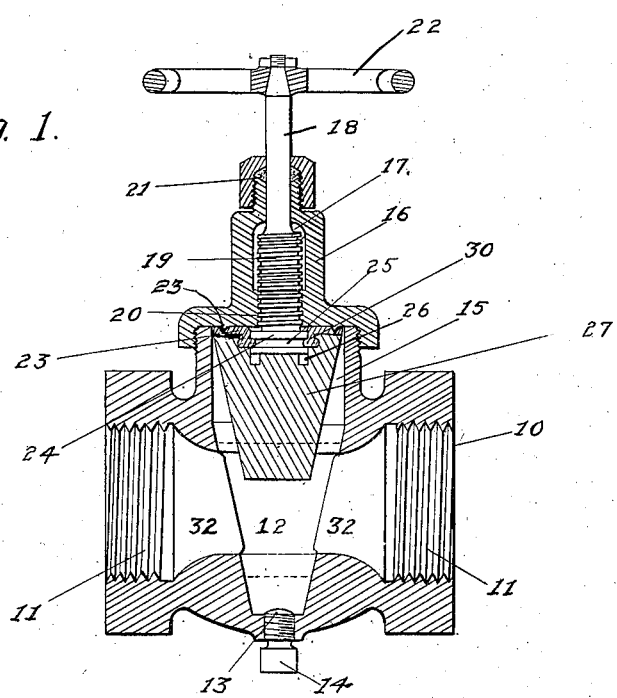
Figure 1 is a vertical, central, sectional view of my improved valve.

Referring to Figure 1 of the drawings, I have used the reference numeral 10 to indicate the body portion of my improved valve which is substantially of the ordinary construction, and provided with screw threaded pipe union members 11.

That portion of the body portion between the members 11 is provided with a vertically arranged and inverted conical opening 12 which is ground to form a valve seat.

The bottom of the valve opening 12 is provided with an opening 13 which is designed to receive a screw threaded plug 14. The upper end of the valve opening 12 is provided with a cylindrical opening 15, the upper end of which is provided with a cap 16 substantially of the ordinary construction.

The cap 16 is provided with an opening 17 which is designed to receive a valve stem 18. The lower end of the stem 18 is provided with a screw threaded portion 19 to coact with the screw threaded portion 20 of the cap 16. The valve stem is also provided with the usual packing gland 21 and a hand wheel 22.

The under face of the cap 16 is provided with an annular flange 23 of a slightly less diameter than the inside diameter of the opening 15, the purpose of which will hereinafter be made clear.

The lower end of the member 19 is provided with a head portion 24 which is considerably larger than the screw threaded portion 19. This head 24 is provided with an annular groove 25 in its periphery. The under face of the head 24 is provided with a pair of downwardly extending lugs 26.

The head 24 and the lugs 26 are designed to carry what I shall term the automatic sealing valve 27, which is in the form of a truncated cone placed in an inverted position within the openings 12 and 15.

The base of the member 27 is provided with a cylindrical opening 28 slightly larger than the head 24. The opening 28 is provided with an enlarged opening 29 at its upper end. The opening 29 is provided with an annular groove 30. The opening 28 is provided with two holes 31 near the outer edge of the opening 28, and so spaced that they may receive the lugs 26.

The inclined conical face of the member 27 is designed to fit the inner face of the opening 12 in such a manner that the said opening may be closed when the member 12 is in its lower limit of movement within the said opening.

The opening 12 is provided with passageways 32 which communicate with the screw threaded openings of the members 11.

In assembling my device, the cap member 16 is removed from the upper end of the shell of the opening 16, after which the lug 24 is removed from the cap 16 and placed within the opening 28 of the member 27 with the lugs 26 in the holes 31. This leaves the annular groove 25 in line with the annular groove 30.

I then pour a fusible metal over the top or base of the member 27 which runs down through the opening 29 into the grooves 25 and 30. This provides means for locking the members 24 and 27 together.

The fusible metal is distributed evenly over the upper face of the member 27 so as to form a thin layer of metal over the entire face. The member 29 is then placed in position in the cap 16 and the said cap placed on the upper end of the shell of the opening 15, after which the hand wheel 22 is operated to tightly draw the upper face of the fusible metal against the lower face of the cap 16, and also against the downwardly projecting flange 23.

The flange 23, as clearly shown in the drawings, is provided with a sharp edge in such a manner that as the sealing member 27 is drawn upwardly, the fusible metal will be forced against the under face of the cap 16 and also against the flange 23. The said flange causing a portion of the outer edge of the fusible metal to be forced outwardly against the inner face of the opening 15, it being understood that the fusible metal is comparatively soft and pliable.

Thus it will be seen that I have provided means for sealing the upper end of the opening 15 so that no gas may escape even if the packing gland 21 was not properly made or if the screw threaded portion of the cap 16 was not sufficiently tight.

Assuming that the member 10 has been placed in a pipe line at any convenient or desirable point, and it is desired to use the valve as a cut-off, the operator grasps the handle 22 and rotates the stem 18 which will cause the member 27 to also be rotated and lowered until the member 27 closes the opening 12. A reverse movement of the handle 22 will turn the sealing member to its original position, at which time the supply pipes are in communication with the stove or lamps.

If for any reason a fire should be started in the building near the point where the valve is located, the fusible metal will become melted and the member 27 will automatically drop to its closed position and the gas supply will thereby be automatically cut off, and the valve will assume the position as indicated by dotted lines. After the member 27 has been dropped to the closed position, the same may be easily and quickly removed when so desired by simply removing the plug 14 and inserting a small rod through the opening 13 and pushing the sealing member upwardly.

The parts may then be dissembled and again sealed, as before described, after which it will be ready for operation.

Thus it will be seen that the same valve mechanism may be used from time to time by simply replacing the fusible metal, thereby avoiding the necessity of having to buy a new valve.

I am well aware of the fact that a number of valves have been invented and manufactured for the same purpose, a number of which are provided with automatic sealing members, similar in shape to the sealing member of my device, and operated by being released through the melting of a fusible metal.

I am also aware that several of these devices are so constructed that the valve may be used either as a manually operated cut-off valve or an automatically controlled cut-off valve, but all of this type of valves that I know of that have been heretofore constructed are formed with the valve member and the stem member integral so that the said stem member may be provided with a fusible device for holding it in an elevated position. The melting of the fusible member permits the stem and the valve to drop in unison.

I find that this is very objectionable due to the fact that the stem is provided with packing and will not readily drop, even if the metal is melted.

It is true that some of these are provided with springs for forcing the valve into its closed position, but even then this is objectionable as the packing of such valves often becomes slightly corroded to the valve stem, and it is almost impossible to have a spring of such pressure as to insure positive action. Neither do any of the previous valves of my knowledge employ the fusible member for the purpose of packing the upper portion of the valve openings.

It will further be seen that by employing the lugs 26 I have provided means whereby the valve member will be pivotally driven through the valve stem without loosening the fusible metal from its coacting parts.

It will, therefore, be seen that I have provided a valve of simple, durable and inexpensive construction and which is positive in its operation and which may be made absolutely tight against leakage.

I claim as my invention:

1. An automatic cut-off valve comprising a body portion having a valve opening, a detachable cap member for said valve opening, a sealing valve member in said valve opening, said sealing valve member being provided with an opening having its side portions provided with an annular groove and its bottom with a number of holes, the outer end of said opening being provided with an enlarged portion, a valve stem in said cap having one end extending into said opening and provided with lugs to coact with the holes in said opening, the inwardly extending portion of said valve stem being provided with an annular groove in alinement with the annular groove of said valve member, the said annular grooves and the enlarged portion of said opening being designed to receive a fusible metal, said fusible metal being designed to cover that face of said valve which has the said opening.

2. An automatic cut-off valve comprising a body portion having a valve opening, a cap, a valve stem, a sealing valve member, fusible means for connecting said valve stem in said valve member, said fusible material being designed to cover that face of the valve member which rests adjacent to the inner face of said cap, substantially as described and for the purposes stated.

3. An automatic cut-off valve comprising a body portion having a valve opening provided with a valve seat, a detachable cap for the valve opening, a valve stem in said cap having one end extending downwardly in said valve opening, said downwardly extending end being provided with a number of projecting pins, a valve for said valve seat, the upper face of said valve being provided with openings for receiving the downwardly projecting members of said stem in such a manner that the valve is free to slide off of said downwardly extending portions by gravity, and fusible means for connecting said stem and said valve.

4. The combination of a valve stem having one end provided with a cylindrical enlarged portion, said enlarged portion being provided with an annular groove, a face of said enlarged portion being provided with laterally extending pins, the valve having an opening in one of its faces, said opening having its face provided with an annular groove and its bottom with openings to coact with the laterally extending pins, the annular groove of said cylindrical portion of said stem and the one of said valve being in alinement with each other, the said annular grooves being designed to receive a fusible metal for the purpose of securing the valve and said stem together.

Des Moines, Iowa, August 8, 1922.

JOHN WILBUR.